US010508808B2

(12) United States Patent
Drake

(10) Patent No.: US 10,508,808 B2
(45) Date of Patent: Dec. 17, 2019

(54) GAS TURBINE ENGINE WAVE GEOMETRY COMBUSTOR LINER PANEL

(71) Applicant: United Technologies Corporation, Hartford, CT (US)

(72) Inventor: Christopher Drake, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 926 days.

(21) Appl. No.: 14/893,781

(22) PCT Filed: Jun. 12, 2014

(86) PCT No.: PCT/US2014/042124
§ 371 (c)(1),
(2) Date: Nov. 24, 2015

(87) PCT Pub. No.: WO2014/201249
PCT Pub. Date: Dec. 18, 2014

(65) Prior Publication Data
US 2016/0109128 A1    Apr. 21, 2016

Related U.S. Application Data

(60) Provisional application No. 61/866,285, filed on Aug. 15, 2013, provisional application No. 61/835,153, filed on Jun. 14, 2013.

(51) Int. Cl.
*F02C 1/00*    (2006.01)
*F23R 3/00*    (2006.01)
(Continued)

(52) U.S. Cl.
CPC ............. *F23R 3/002* (2013.01); *F02C 7/18* (2013.01); *F23R 3/005* (2013.01); *F23R 3/44* (2013.01);
(Continued)

(58) Field of Classification Search
CPC ............ F05D 2260/201; F23R 3/002; F23R 2900/03044
See application file for complete search history.

(56) References Cited

U.S. PATENT DOCUMENTS 2,477,583 A * 8/1949 De Zubay ............... F23R 3/002
431/158
2,913,873 A * 11/1959 Murray .................. F23R 3/002
60/756
(Continued)

FOREIGN PATENT DOCUMENTS

EP         2549063          1/2013

OTHER PUBLICATIONS

Extended EP Search Report dated Jun. 16, 2016.
Office action for EP14811706.2 dated Oct. 5, 2017.

*Primary Examiner* — Gerald L Sung
(74) *Attorney, Agent, or Firm* — O'Shea Getz P.C.

(57) ABSTRACT

A panel for a combustor of a gas turbine engine includes a cold side defining at least one convex portion and at least one concave portion. The concave portion is in communication with a passage. A method of operating a combustor section of a gas turbine engine includes: directing an impingement flow toward a multiple of peaks on a cold side of a panel; directing the impingement flow from the multiple of peaks toward a multiple of troughs with a multiple of entrances on the cold side of the panel; and directing the impingement flow through the multiple of entrances and a respective multiple of effusion passages through the panel.

15 Claims, 8 Drawing Sheets

(51) Int. Cl.
*F23R 3/50* (2006.01)
*F23R 3/60* (2006.01)
*F02C 7/18* (2006.01)
*F23R 3/44* (2006.01)

(52) U.S. Cl.
CPC ............ *F23R 3/50* (2013.01); *F23R 3/60* (2013.01); *F05D 2250/611* (2013.01)

(56) References Cited

U.S. PATENT DOCUMENTS

| | | | | |
|---|---|---|---|---|
| 3,038,309 A * | 6/1962 | Waters | ............... | F23R 3/002 60/757 |
| 4,878,283 A | 11/1989 | McLean | | |
| 5,144,795 A * | 9/1992 | Field | ............... | F02K 1/822 239/127.3 |
| 5,181,379 A * | 1/1993 | Wakeman | ............... | F02K 1/822 60/753 |
| 5,279,127 A | 1/1994 | Napoli | | |
| 5,329,773 A * | 7/1994 | Myers | ............... | F23R 3/002 60/759 |
| 5,353,865 A * | 10/1994 | Adiutori | ............... | F28F 13/02 165/109.1 |
| 5,465,572 A | 11/1995 | Nicoll et al. | | |
| 5,647,202 A * | 7/1997 | Althaus | ............... | F02K 1/822 165/908 |
| 2002/0062945 A1* | 5/2002 | Hocker | ............... | F01D 5/189 165/53 |
| 2003/0213250 A1 | 11/2003 | Pacheco-Tougas et al. | | |
| 2006/0096293 A1* | 5/2006 | Norris | ............... | F23C 15/00 60/776 |
| 2008/0264065 A1 | 10/2008 | Gerendas | | |
| 2010/0316492 A1 | 12/2010 | Charron et al. | | |
| 2011/0232299 A1* | 9/2011 | Stryapunin | ............... | F23R 3/04 60/806 |
| 2012/0255311 A1 | 10/2012 | Yoshiaki | | |
| 2013/0074507 A1* | 3/2013 | Kaleeswaran | ............... | F23R 3/002 60/754 |
| 2017/0191417 A1* | 7/2017 | Bunker | ............... | F23R 3/005 |
| 2019/0186740 A1* | 6/2019 | Moura | ............... | F23R 3/06 |

* cited by examiner

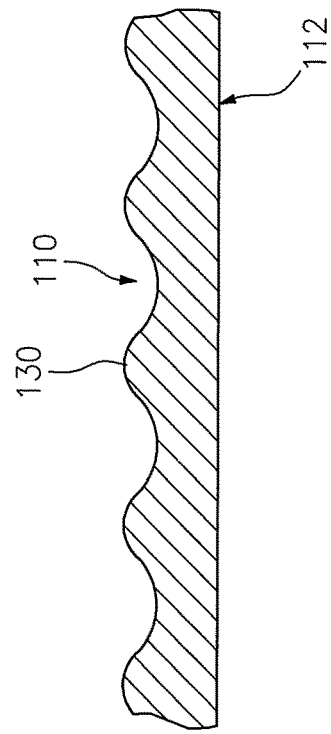
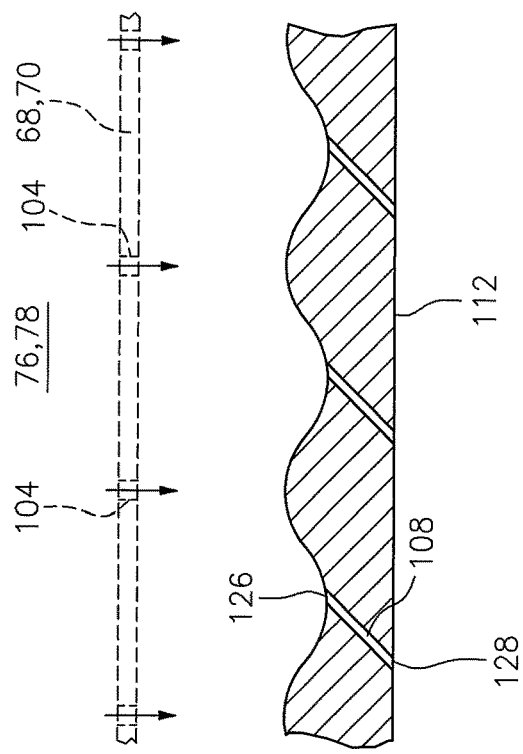

GAS TURBINE ENGINE WAVE GEOMETRY COMBUSTOR LINER PANEL

CROSS-REFERENCE TO RELATED APPLICATION

This application claims priority to PCT Patent Application No. PCT/US14/42124 filed Jun. 12, 2014, which claims priority to U.S. Patent Appln. No. 61/866,285 filed Aug. 15, 2013 and U.S. Patent Appln. No. 61/835,153 filed Jun. 14, 2013.

STATEMENT REGARDING FEDERALLY SPONSORED RESEARCH OR DEVELOPMENT

This disclosure was made with Government support under FA-8650-09-D-2923-0021 awarded by the United States Air Force. The Government may have certain rights in this disclosure.

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Advanced engine cycles require the combustor section to operate at high compressor exit temperatures. A survey of typical flight envelopes often reveals that high compressor exit temperatures exist with reduced supply pressure at high altitude. These operational conditions result in relatively high convection and radiation high heat loads.

SUMMARY

A panel is provided for a combustor of a gas turbine engine according to one disclosed non-limiting embodiment of the present disclosure. This panel includes a cold side defining at least one convex portion and at least one concave portion. The concave portion is in communication with a passage.

In a further embodiment of the present disclosure, the convex and the concave portions may form a wave pattern.

In a further embodiment of any of the foregoing embodiments of the present disclosure, the concave portion may be in communication with the passage defines an entrance to the passage. The entrance may be displaced from a peak of the wave pattern.

In a further embodiment of any of the foregoing embodiments of the present disclosure, the passage may be an effusion flow passage.

In a further embodiment of any of the foregoing embodiments of the present disclosure, the wave pattern may be skewed.

In a further embodiment of any of the foregoing embodiments of the present disclosure, the wave pattern may include transverse ridges.

In a further embodiment of any of the foregoing embodiments of the present disclosure, at least one concave portion may define an entrance to the passage. The entrance may be separated longitudinally by adjacent peaks and laterally by adjacent transverse ridges.

In a further embodiment of any of the foregoing embodiments of the present disclosure, the wave pattern may be continuous.

In a further embodiment of any of the foregoing embodiments of the present disclosure, at least one concave portion and at least one convex portion may be integrally formed adjacent one another from a common surface of the cold side.

A combustor of a gas turbine engine is provided according to another disclosed non-limiting embodiment of the present disclosure. This combustor includes a shell with a multiple of impingement flow passages. The combustor also includes a panel mounted to the shell. The panel defines a wave pattern on a cold side thereof. The wave pattern includes a multiple of peaks and troughs. The troughs define a multiple of corresponding entrances to a respective multiple of effusion passages through the panel.

In a further embodiment of any of the foregoing embodiments of the present disclosure, a plurality of studs may extend from the cold side of the panel.

A further embodiment of any of the foregoing embodiments of the present disclosure, at least one of the multiple of impingement flow passages may be directed at one of the multiple of peaks.

In a further embodiment of any of the foregoing embodiments of the present disclosure, at least one of the multiple of effusion flow passages may define an angle through the panel.

In a further embodiment of any of the foregoing embodiments of the present disclosure, a multiple of transverse ridges may be included along the multiple of peaks and troughs.

In a further embodiment of any of the foregoing embodiments of the present disclosure, the wave pattern may be skewed toward downstream nozzle guide vanes.

A method of operating a combustor section of a gas turbine engine is provided according to another disclosed non-limiting embodiment of the present disclosure. This method includes: directing an impingement flow toward a multiple of peaks on a cold side of a panel; directing the impingement flow from the multiple of peaks toward a multiple of troughs with a multiple of entrances on the cold side of the panel; and directing the impingement flow through the multiple of entrances and a respective multiple of effusion passages through the panel.

In a further embodiment of any of the foregoing embodiments of the present disclosure, the method may include segregating each of the entrances.

In a further embodiment of any of the foregoing embodiments of the present disclosure, the method may include separating each of the entrances from one another longitudinally by adjacent peaks and laterally by adjacent transverse ridges.

In a further embodiment of any of the foregoing embodiments of the present disclosure, the method may include locating each of the entrances in a lowest portion of the multiple of troughs.

In a further embodiment of any of the foregoing embodiments of the present disclosure, the method may include displacing each of the multiple of entrances from respective exits of the effusion passages such that the effusion passages define respective angles relative to a hot side of the liner panel.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 8 is a sectional view of the multiple of heat transfer augmentors of FIG. 7; and FIG. 9 is a cold side view of a combustor liner panel with a multiple of heat transfer augmentors according to another disclosed non-limiting embodiment.

DETAILED DESCRIPTION

Figure 1:
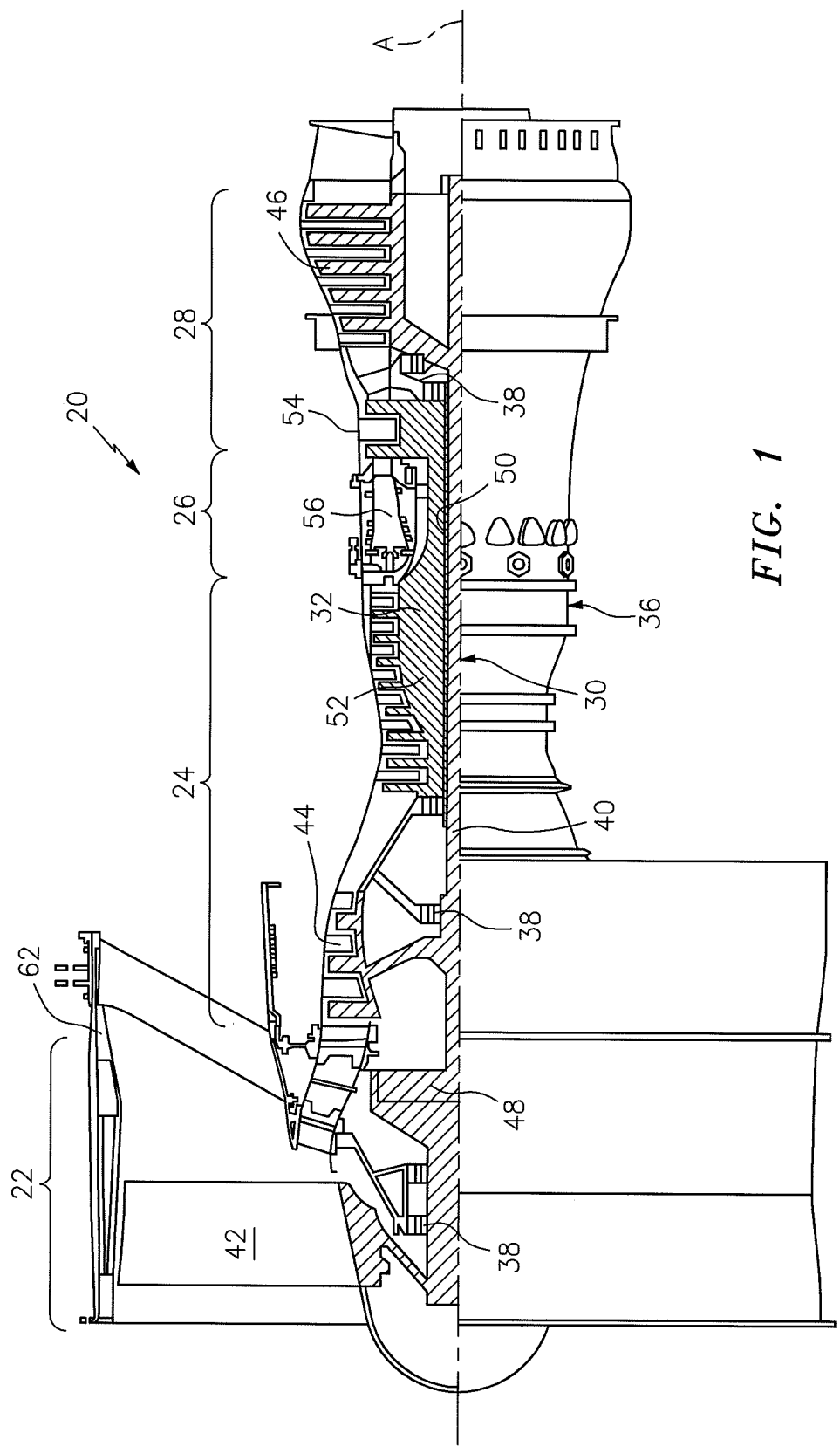
FIG. 1 is a schematic cross-section of an example gas turbine engine architecture.
Figure 2:
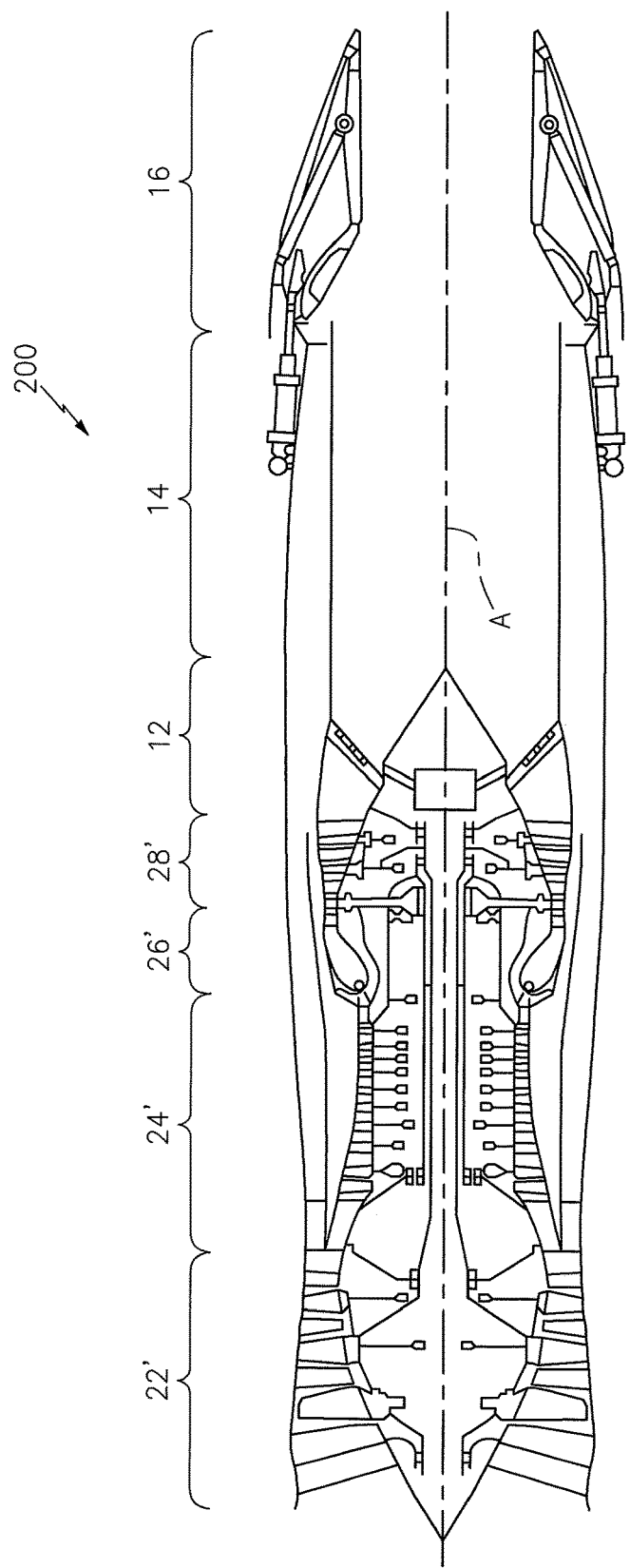
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Referring to FIG. 2, alternative engine architectures 200 might include an augmentor section 12, an exhaust duct section 14 and a nozzle section 16 in addition to the fan section 22', compressor section 24', combustor section 26' and turbine section 28' among other systems or features. Referring again to FIG. 1, the fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between a high pressure turbine ("HPT") and a low pressure turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 as illustrated in FIG. 1 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective high spool 32 and low spool 30 in response to the expansion. The main engine shafts 40, 50 are supported at a plurality of points by the bearing structures 38 within the static structure 36. It should be understood that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 3:
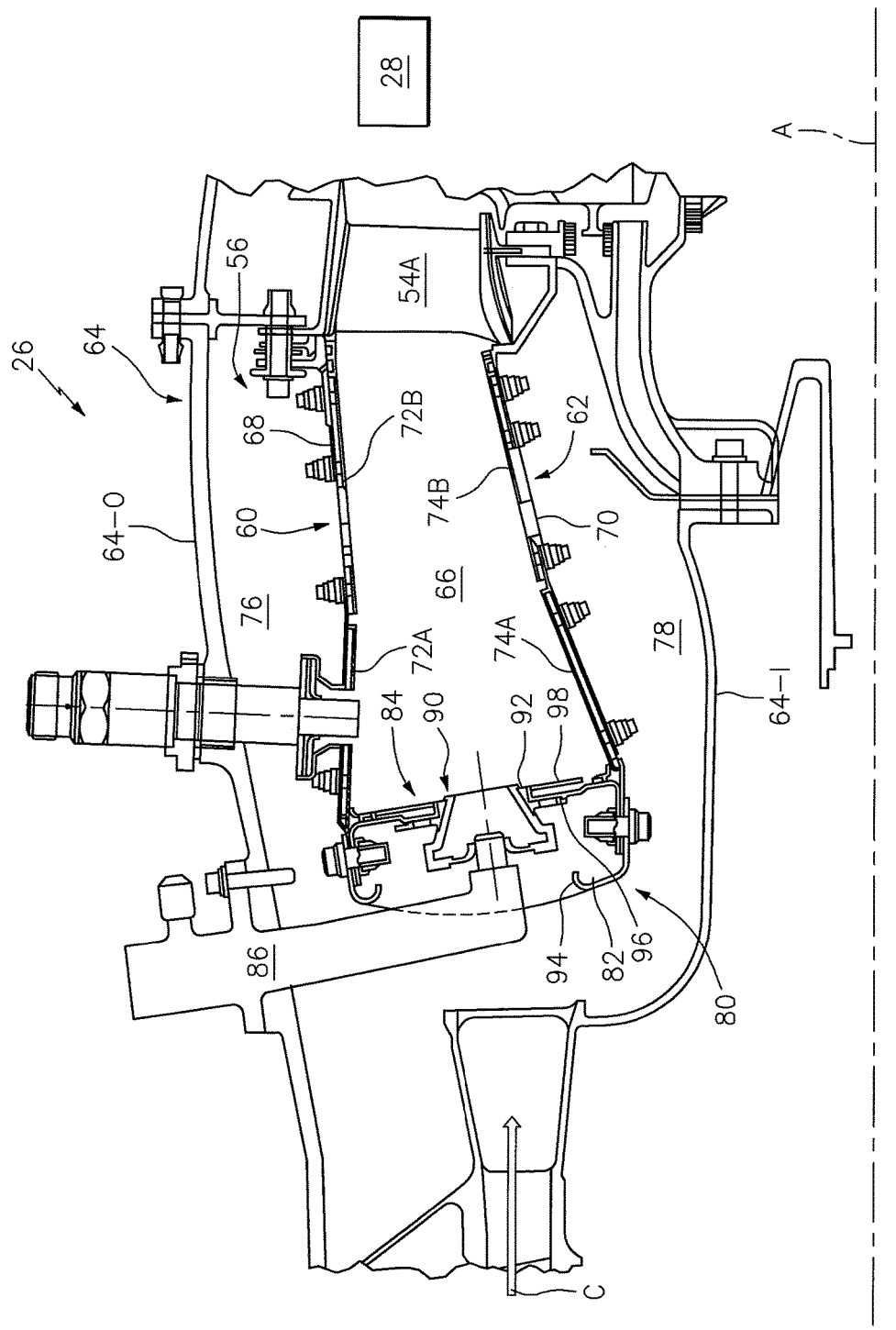
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes the combustor 56 with an outer combustor liner assembly 60, an inner combustor liner assembly 62 and a diffuser case module 64. The outer combustor liner assembly 60 and the inner combustor liner assembly 62 are spaced apart such that a combustion chamber 66 is defined therebetween. The combustion chamber 66 is generally annular in shape.

The outer combustor liner assembly 60 is spaced radially inward from an outer diffuser case 64-O of the diffuser case module 64 to define an outer annular plenum 76. The inner combustor liner assembly 62 is spaced radially outward from an inner diffuser case 64-I of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustion chamber 66 contains the combustion products for direction toward the turbine section 28. Each combustor liner assembly 60, 62 generally includes a respective support shell 68, 70 which supports one or more liner panels 72, 74 mounted to a hot side of the respective support shell 68, 70. Each of the liner panels 72, 74 may be generally rectilinear and manufactured of, for example, a nickel based super alloy, ceramic or other high temperature resistant material and are arranged to form a liner array. In one disclosed non-limiting embodiment, the liner array includes a multiple of forward liner panels 72A and a multiple of aft liner panels 72B that are circumferentially staggered to line the hot side of the outer shell 68 (also shown in FIG. 4). A multiple of forward liner panels 74A and a multiple of aft liner panels 74B are circumferentially staggered to line the hot side of the inner shell 70.

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of fuel nozzle guides 90 (one shown). Each of the fuel nozzle guides 90 is circumferentially aligned with one of the hood ports 94 to project through the bulkhead assembly 84. Each bulkhead assembly 84 includes a bulkhead support shell 96 secured' to the combustor liner assemblies 60, 62, and a multiple of circumferentially distributed bulkhead liner panels 98 secured to the bulkhead support shell 96 around the central opening 92.

The annular hood 82 extends radially between, and is secured to, the forwardmost ends of the combustor liner assemblies 60, 62. The annular hood 82 includes a multiple of circumferentially distributed hood ports that accommodate the respective fuel nozzle 86 and introduce air into the forward end of the combustion chamber 66 through a central opening 92. Each fuel nozzle 86 may be secured to the diffuser case module 64 and project through one of the hood ports and through the central opening 92 within the respective fuel nozzle guide 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and the inner support shells 68, 70 are mounted to a first row of nozzle guide vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
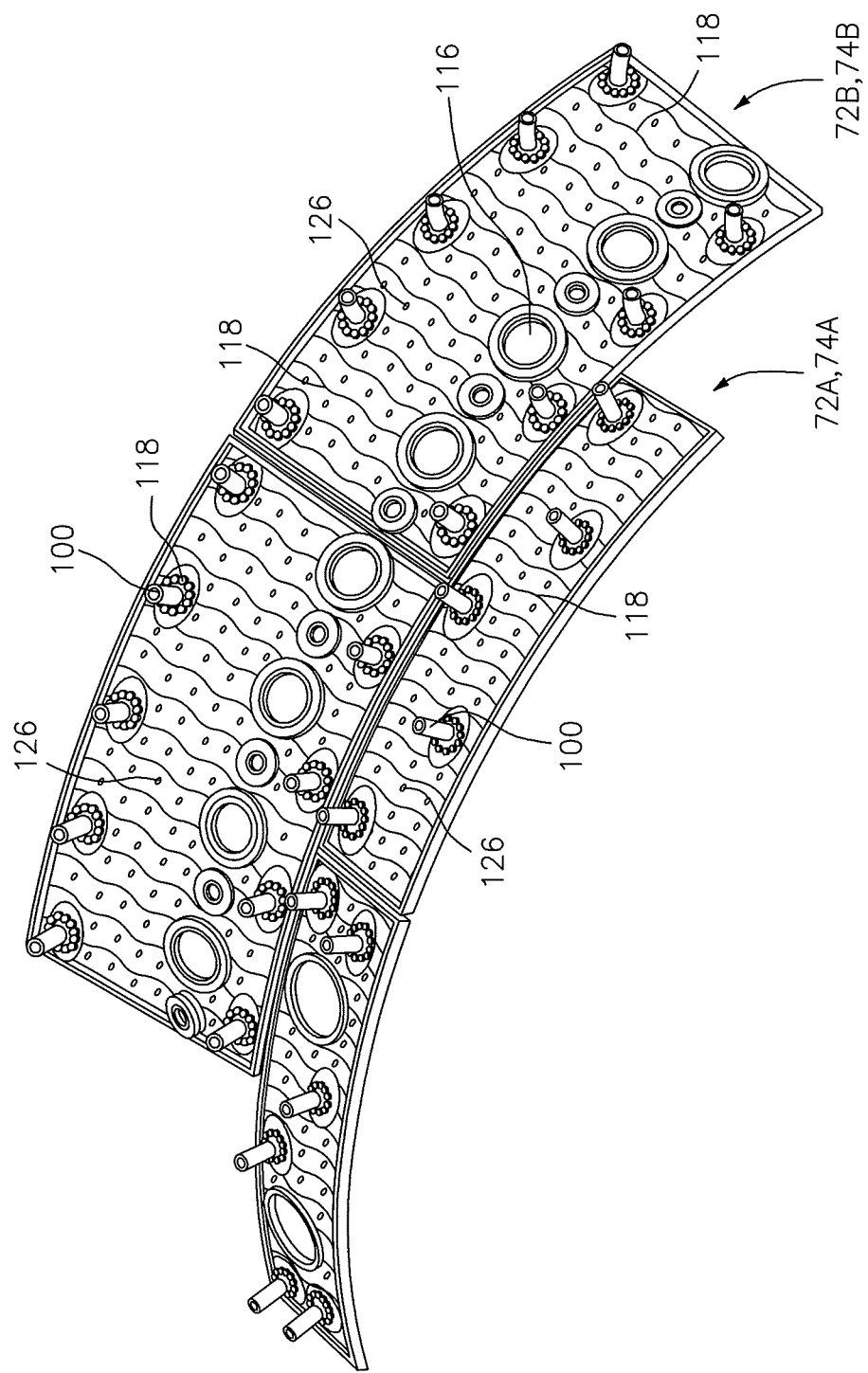
FIG. 4 is an expanded perspective view of a liner panel array from a cold side.
Figure 5:
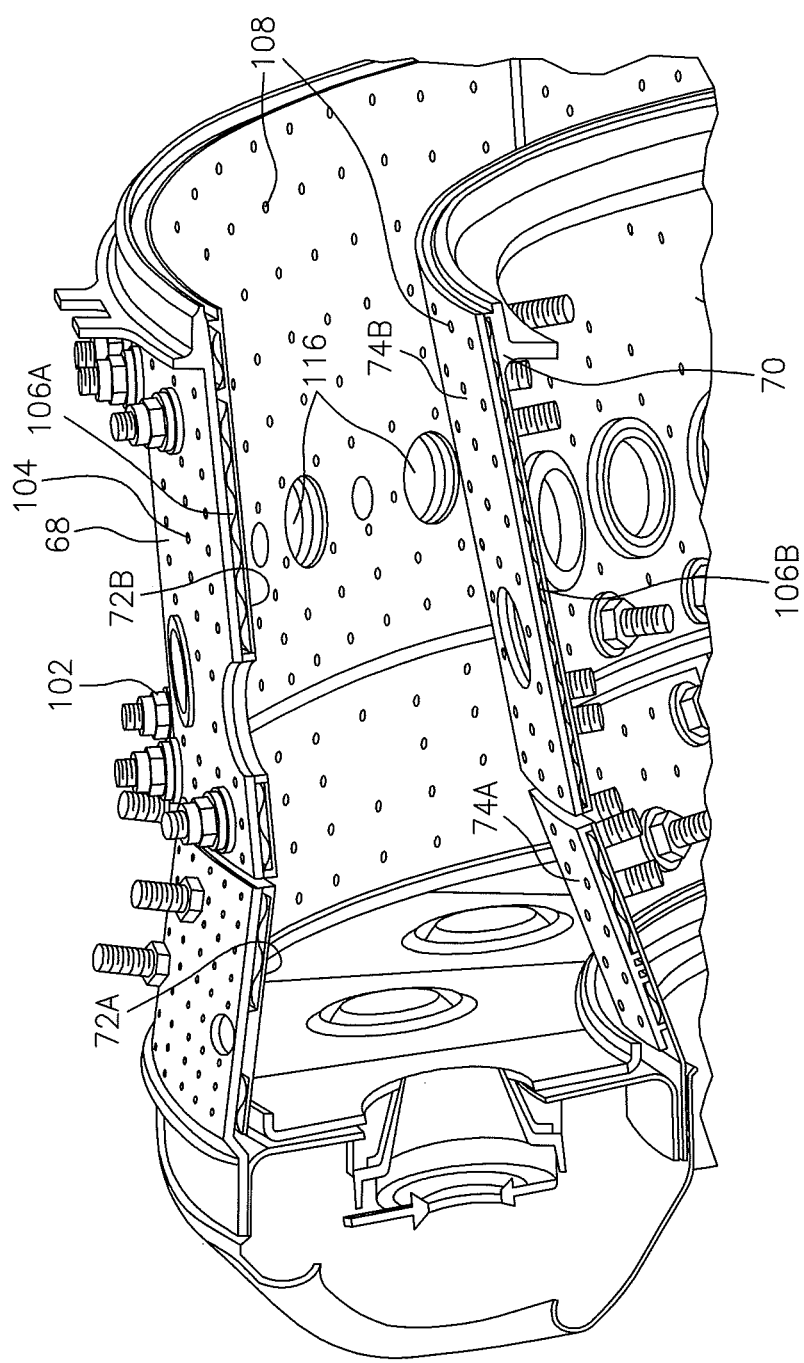
FIG. 5 is a perspective partial longitudinal sectional view of the combustor section.

With reference to FIG. 4, a multiple of studs 100 extend from the liner panels 72, 74 so as to permit the liner panels 72, 74 to be mounted to their respective support shells 68, 70 with fasteners 102 such as nuts (shown in FIG. 5). That is, the studs 100 project rigidly from the liner panels 72, 74 and through the respective support shells 68, 70 to receive the fasteners 102 at a threaded distal end section thereof.

A multiple of cooling impingement passages 104 (see FIGS. 5 and 6) penetrate through the support shells 68, 70 to allow air from the respective annular plenums 76, 78 to enter cavities 106A, 106B (also shown in FIG. 6) formed in the combustor liner assemblies 60, 62 between the respective support shells 68, 70 and liner panels 72, 74. The cooling impingement passages 104 are generally normal to the surface of the liner panels 72, 74. The air in the cavities 106A, 106B provides cold side impingement cooling of the liner panels 72, 74 that is generally defined herein as heat removal via internal convection.

A multiple of effusion passages 108 penetrate through each of the liner panels 72, 74. The geometry of the passages (e.g., diameter, shape, density, surface angle, incidence angle, etc.) as well as the location of the passages with respect to the high temperature main flow also contributes to effusion film cooling Liner panels 72, 74 with combination of impingement passages 104 and effusion passages 108 may be referred to as an Impingement Film Floatwall (IFF) assembly.

Figure 6:
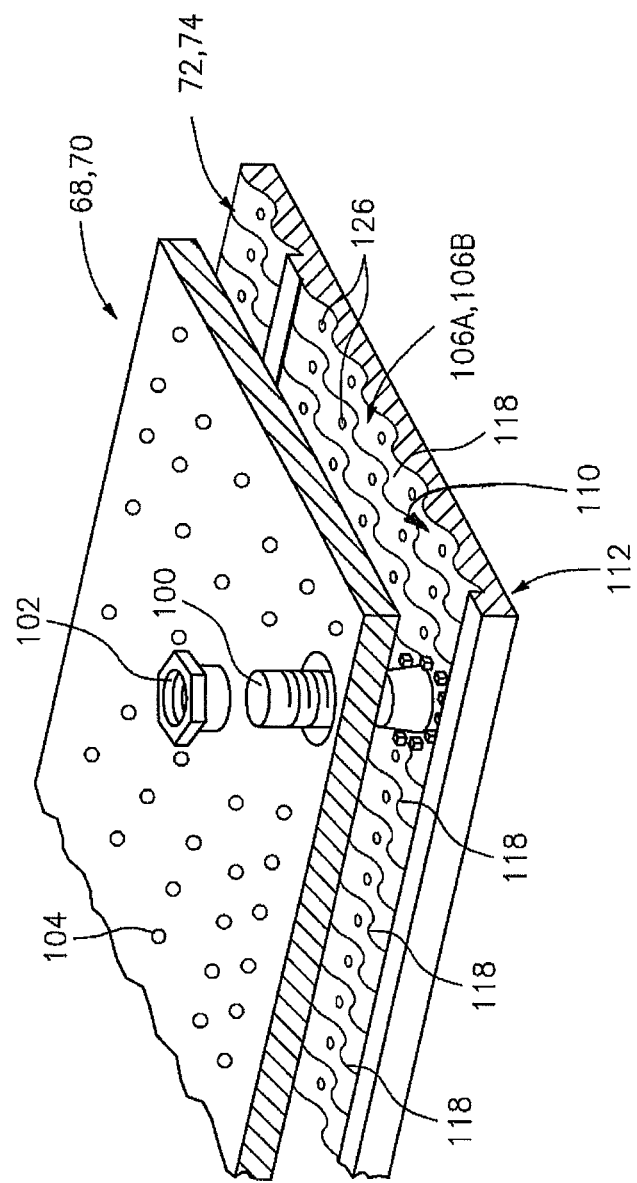
FIG. 6 is an exploded view of a liner assembly of the combustor section.

Referring to FIG. 6, the effusion passages 108 allow the air to pass from the cavities 106A, 106B defined in part by a cold side 110 of the liner panels 72, 74 to a hot side 112 of the liner panels 72, 74 and thereby facilitate the formation of thin, cool, insulating blanket or film of cooling air along the hot side 112. The effusion passages 108 are generally more numerous than the impingement passages 104 to promote the development of film cooling along the hot side 112 to sheath the liner panels 72, 74. Film cooling as defined herein is the introduction of a relatively cooler air at one or more discrete locations along a surface exposed to a high temperature environment to protect that surface in the region of the air injection as well as downstream thereof.

A multiple of dilution passages 116 may penetrate through both the respective support shells 68, 70 and liner panels 72, 74 along a common axis (see FIG. 5). For example only, in a Rich-Quench-Lean ("R-Q-L") type combustor, the dilution passages 116 are located downstream of the forward assembly 80 to quench the hot combustion gases within the combustion chamber 66 by direct supply of cooling air from the respective annular plenums 76, 78.

Some engine cycles and architectures demand that the gas turbine engine combustor 56 operate at relatively high compressor exit temperatures aft of the HPC 52—referred to herein as T3. As further perspective, T1 is a temperature in front of the fan section 22; T2 is a temperature at the leading edge of the fan 42; T2.5 is the temperature between the LPC 44 and the HPC 52; T3 is the temperature aft of the HPC 52; T4 is the temperature in the combustion chamber 66; T4.5 is the temperature between the HPT 54 and the LPT 46; and T5 is the temperature aft of the LPT 46 (see FIG. 1). These engine cycles and architectures also result in a further requirement that the high compressor exit temperatures exist in concert with a cooling air supply pressure decrease at higher altitudes. That is, available pressures may not be sufficient for cooling requirements at high altitudes as the heat transfer capability of the liner panels 72, 74 decrease by a factor of about two (2) as supply pressures decreases from, for example, sea level ram air flight conditions to higher altitude up and away flight conditions. The increased internal heat transfer coefficient of T3 for these engine cycles and architectures may require an increase of total heat transfer, specifically convective heat transfer, between the cooling air (T3) and the gas path air (T3.1).

With reference to FIG. 6, a multiple of heat transfer augmentors 118 extend from the cold side 110 of each liner panel 72, 74 to increase heat transfer. The support shells 68, 70 and liner panels 72, 74 may be manufactured via an additive manufacturing process that facilitates incorporation of the relatively small heat transfer augmentors 118 as well as the cooling impingement passages 104, the effusion passages 108 (see FIG. 5), dilution passages 116 and or other features. One additive manufacturing process includes powder bed metallurgy in which layers of powder alloy such as nickel, cobalt, or other material is sequentially build-up by systems from, for example, Concept Laser of Lichtenfels, Del. and EOS of Munich, Del., e.g. direct metal laser sintering or electron beam melting.

Figure 7:
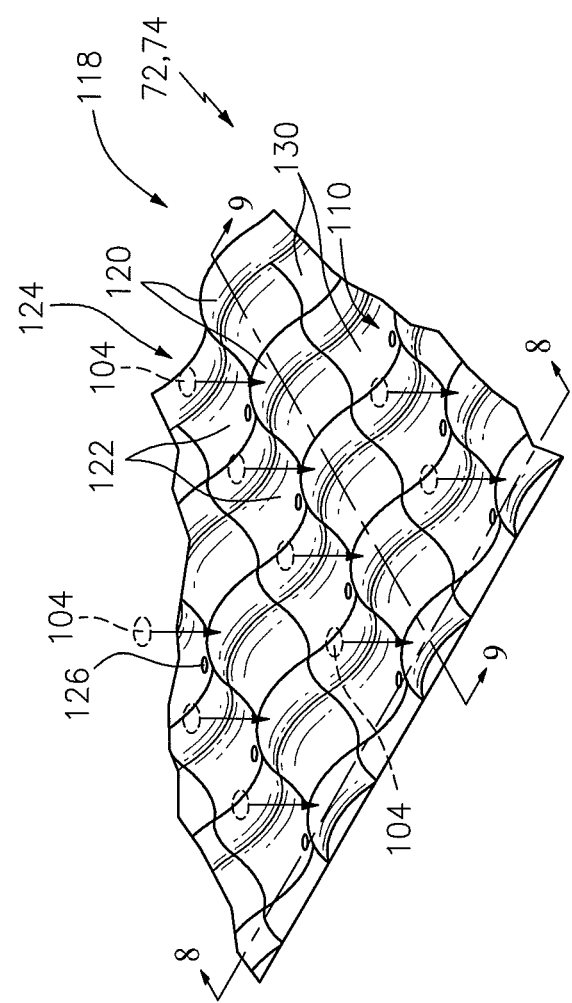
FIG. 7 is a cold side view of a combustor liner panel with a multiple of heat transfer augmentors according to one disclosed non-limiting embodiment.

With reference to FIG. 7, in one disclosed non-limiting embodiment, each of the multiple of heat transfer augmentors 118 defines alternating peaks 120 and troughs 122 of a wave pattern 124 defined by the cold side 110 of each liner panel 72, 74. It should be appreciated that the wave pattern 124 may be skewed or otherwise geometrically shaped to have various predefined wavelengths and/or amplitudes. The part of the wave pattern 124 half-way in between the peak 120 and the trough 122 may be defined as the baseline, the peak 120 is generally convex and the trough 122 is generally concave. In one disclosed non-limiting embodiment, the wave pattern 124 may be circumferentially arranged about the combustor chamber 66 and skewed toward the downstream NGVs 54A. It should also be appreciated that the wave pattern 124 need not be located over the entirety of the cold side 110 of each liner panel 72, 74.

Each trough 122 includes an entrance 126 to a respective effusion passage 108 at the lowest point therein (see FIG. 8). In other words, the entrance is in the cold side 110 at the closest location to the hot side 112. The peaks 120 that flank each trough 122 facilitate capture and direction of air into each of the effusion passages 108.

In another disclosed non-limiting embodiment, ridges 130 may be arranged transverse to the wave pattern 124 to at least partially segregate each entrance 126 (also shown in FIG. 9). That is, each entrance 126 is separated longitudinally by adjacent peaks 120 and laterally by adjacent ridges 130. It should be appreciated that various arrangements may alternatively or additionally provided.

The entrance 126 may be displaced from an exit 128 of the effusion passages 108 such that the effusion passage 108 defines an angle through each liner panel 72, 74 (see FIG. 8). That is, the effusion passage 108 need not be perpendicular through each liner panel 72, 74 with respect to the hot side 112 and may be angled with respect to the wave pattern 124.

In this disclosed non-limiting embodiment, the multiple of cooling impingement passages 104 penetrate through the support shells 68, 70 to allow air from the respective annular plenums 76, 78 to impinge onto the peaks 122 (see FIG. 8). That is, the multiple of cooling impingement the passages 104 may be directed onto the peaks 120 such that the impingement air can turbulate and cause a pressure increase. As the impingement air is turbulated off the cold side 110 of each liner panel 72, 74, a pressure drop across the liner panel 72, 74 can develop to facilitate navigation of the air into the effusion passages 108 thence the combustion chamber 66.

After the impingement air is turbulated off of the peaks 120, a pressure drop across the panel 72, 74 can cause the air to navigate into the troughs 122 thence the effusion passage 108 and the combustor chamber 66. The entrance 126 to the effusion passages 108 is located within the troughs 122 and segregated by the peaks 120 and ridges 130. This essentially increases the cooling air navigation path to the entrance 126 and increases the time for convective heat transfer to facilitate cooling effectiveness.

Cooling effectiveness of the liner panel 72, 74 may depend on a number of factors, one of which is the heat transfer coefficient. This heat transfer coefficient depicts how well heat is transferred from the liner panel 72, 74, to the cooling air. As the liner panel 72, 74 surface area increases, this coefficient increases due to a greater ability to transfer heat to the cooling air—turbulation of the air also increases this heat transfer. The peaks 120 and the troughs 122 increase these two factors, and thereby increase the cooling ability of the line panel 72, 74.

In general, flow transition from the stagnation impingement flow to turbulence follows the mechanism associated with turbulence creation through unstable Tollmien-Schiliting peaks, three-dimensional instability, then by vortex breakdown in a cascading process which leads to intense flow fluctuations and energy exchange or high heat transfer. This natural process, facilitated by the multiple of heat transfer augmentors 118, allows for high energy exchange, produces turbulence, coalescence of turbulence spot assemblies and redirection of flow towards more sensitive heat transfer areas, along with flow reattachment. All these factors lead to intense energy transport.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A combustor of a gas turbine engine comprising:
a shell comprising a multiple of impingement flow passages; and
a panel mounted to said shell, said panel defining a wave pattern on a cold side thereof, said wave pattern comprising a multiple of peaks and troughs, said troughs defining a multiple of corresponding entrances to a respective multiple of effusion passages through said panel;
wherein at least one of said multiple of impingement flow passages is directed at one of said multiple of peaks; and
wherein each of said entrances is located in a lowest portion of said multiple of troughs.

2. The combustor as recited in claim 1, wherein said wave pattern is skewed.

3. The combustor as recited in claim 1, wherein said wave pattern includes a plurality of transverse ridges.

4. The combustor as recited in claim 3, wherein
each entrance is separated from each other entrance longitudinally by adjacent peaks of the multiple of peaks and laterally by adjacent transverse ridges of the plurality of transverse ridges.

5. The combustor as recited in claim 1, wherein the wave pattern is continuous.

6. The combustor as recited in claim 1, wherein the multiple of troughs and the multiple of peaks are integrally formed adjacent one another from a common surface of the cold side.

7. The combustor as recited in claim 1, wherein each of said multiple of impingement flow passages is directed at a respective one of said multiple of peaks.

8. A combustor of a gas turbine engine comprising:
a shell comprising a multiple of impingement flow passages; and
a panel mounted to said shell, said panel defining a wave pattern on a cold side thereof, said wave pattern including a multiple of peaks and troughs, said troughs defining a multiple of corresponding entrances to a respective multiple of effusion passages through said panel;
wherein each of said multiple of impingement flow passages is directed at a respective one of said multiple of peaks;
wherein each of said entrances is located in a lowest portion of the multiple of troughs; and
wherein said wave pattern is circumferentially arranged about the combustor and is skewed toward downstream nozzle guide vanes.

9. The combustor as recited in claim 8, further comprising a plurality of studs which extend from said cold side of said panel.

10. The combustor as recited in claim 8, wherein at least one of said multiple of effusion flow passages defines an angle through the panel.

11. The combustor as recited in claim 8, wherein said wave pattern includes a multiple of transverse ridges along said multiple of peaks and troughs.

12. A method of operating a combustor section of a gas turbine engine, the method comprising:
directing an impingement flow from at least one impingement flow passage of a multiple of impingement flow passages of a shell toward at least one peak of a multiple of peaks on a cold side of a panel mounted to said shell, said panel defining a wave pattern on said cold side, said wave pattern comprising said multiple of peaks and a multiple of troughs, said multiple of troughs defining a multiple of corresponding entrances to a respective multiple of effusion passages through said panel;
directing the impingement flow from the at least one peak of said multiple of peaks toward at least one trough of said multiple of troughs;
directing the impingement flow through at least one entrance of the multiple of entrances and a respective at least one effusion passage of said multiple of effusion passages; and
wherein each of said multiple of entrances is located in a lowest portion of said multiple of troughs.

13. The method as recited in claim 12, further comprising segregating each of the entrances.

14. The method as recited in claim 12, further comprising separating each of the entrances from one another longitudinally by adjacent peaks and laterally by adjacent transverse ridges.

15. The method as recited in claim 12, further comprising displacing each of the multiple of entrances from respective exits of the effusion passages such that the effusion passages define respective angles relative to a hot side of the liner panel.

* * * * *